Oct. 24, 1933. R. J. ROCKWELL Re. 18,971

DIRECT CURRENT VOLTAGE TRANSFORMATION APPARATUS

Original Filed Dec. 7, 1932 2 Sheets-Sheet 1

INVENTOR.
Ronald J. Rockwell
BY
Allen Allen
ATTORNEY.

Oct. 24, 1933. R. J. ROCKWELL Re. 18,971

DIRECT CURRENT VOLTAGE TRANSFORMATION APPARATUS

Original Filed Dec. 7, 1932 2 Sheets-Sheet 2

INVENTOR.

BY Roswell J. Rockwell

Albert Allen

ATTORNEY.

Reissued Oct. 24, 1933 Re. 18,971

UNITED STATES PATENT OFFICE 18,971

DIRECT-CURRENT VOLTAGE TRANSFORMATION APPARATUS

Ronald J. Rockwell, Cincinnati, Ohio, assignor to The Crosley Radio Corporation, Cincinnati, Ohio, a corporation of Ohio Original No. 1,920,150, dated July 25, 1933, Serial No. 646,194, December 7, 1932. Application for reissue August 21, 1933. Serial No. 686,078

14 Claims. (Cl. 171—97)

My invention relates to mechanical devices for interrupting or otherwise modifying the primary current of a voltage-change device and for rectifying the secondary current thereof. While it will be understood that my invention is by no means confined thereto, for the purpose of making a clear disclosure of my invention in an illustrative and exemplary embodiment, I shall describe it in connection with means for producing a relatively high voltage direct current from a relatively low voltage direct current source, such as finds utility in providing the so-called B current for radio sets. The earliest radio sets for use in automobiles required the use of B batteries which were found to be inconvenient. It was then proposed to produce the relatively high-voltage B current from the low-voltage A source, or storage battery of the car, and to this end a high-ratio transformer was provided and its primary current, which was the 6-volt current from the storage battery was passed through an interrupter, usually of the mechanical vibrating reed type. The secondary or high voltage current, which was of course alternating in form, was then rectified by means of a rectifying tube or tubes usually containing mercury vapor. Electronic tubes are less efficient and also have other disadvantages in the particular use.

The tubes were a source of great trouble under the relatively severe conditions of use in automobiles. A decrease in external temperatures caused the mercury in the tube to fail to vaporize, sometimes for considerable periods of time, under which circumstances the tube acted as an electronic rectifier with a rapid destruction of its elements. So serious has this difficulty been that in many installations, motor generators, operating from the storage battery, have been used to deliver the high voltage B current at obviously greater expense for equipment. Both the motor generators and the tubes are also somewhat lacking in overall efficiency. It will be understood that whether electronic or mercury tubes are used, the filament current is a source of power loss.

Hitherto no satisfactory suggestion has been made to eliminate the tube in the transformer source of high voltage current. This is primarily for the reason that a separate mechanical rectifier applied to the secondary current is an additional source of power loss; and to endeavor to use one vibrating means for both the interrupting of the primary current and the rectification of the secondary, encounters the fundamental difficulty that the fluctuations of the secondary voltage are not suitable for rectification simultaneously, with the interruptions of the primary current. Thus such schemes either do not operate at all; or the device operates at extremely low efficiency because it cannot rectify the entire half wave and destructive sparking occurs.

The general objects of my invention, as well as the specific objects which relate to the exemplary embodiment referred to, will be clear to one skilled in the art from the description which follows. Reference is now made to the drawings, wherein.

Figure 2:
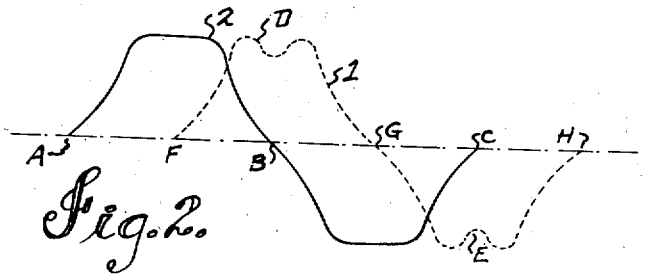
Fig. 2 shows the lagging of the voltage wave of the secondary behind the flux wave.

A reference to Fig. 2 will show how the secondary voltage wave 1 may be out of step by a quarter of a cycle with the flux wave 2. The flux has been shown as varying from a positive to a negative value, which presupposes an arrangement of the primary coil and interrupter contacts, such that the energizing current is actually reversed. This may be accomplished of course by providing a center tap in the primary transformer winding, connecting this center tap with one pole of the source of primary supply current, connecting the other pole of the source of primary supply current to the reed of the vibrator, and providing on either side of the vibrating reed, contacts connected respectively to the end taps of the primary windings. It may also be accomplished by a reversal switch, or other well known means. By mounting the last mentioned contacts upon spring members which can follow the vibrating reed, the time interval between the opening of one contact and the closing of the other can be made very short, and the time during which the contacts are closed may be proportionately lengthened. The curve marked 2 therefore becomes a fair representation of the flux changes. The times of the actual interruptions of the current are represented upon the chart in Fig. 2 at *a*, *b* and *c*. It will be noted that these times coincide with intervals marked *d* and *e*, at which the secondary voltage is at its maximum, whether of a positive or negative value. To attempt rectification of the secondary voltage at the points *d* and *e* will obviously be useless, and while some rectification effect may be secured by changing the contacts of a mechanical rectifier for the secondary current at the points *d* and *e*, if the contacts are held closed for a substantial period thereafter, yet it will be obvious that such a system would be highly inefficient, and that only a relatively small portion of the secondary current would be realized in the rectified output. For the highest efficiency the secondary terminals should be reversed at the point of change between positive and negative secondary voltage values, or at the points *f*, *g* and *h*, which points, it will be noted, occur at the points of minimum flux change, i. e. at the peaks of the wave form illustrated by the flux curve 2.

Figure 3:
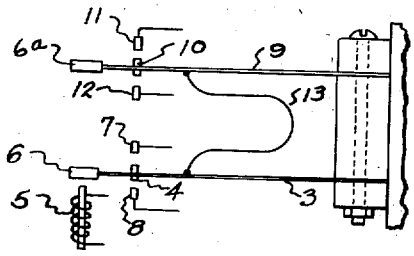
Fig. 3 is a diagrammatic showing of a device whereby the difference in phase relationship may be compensated for by mechanical vibrators which are connected together so as to vibrate one with respect to the other with the interposition of a time interval, though each vibrating element is driven either directly or indirectly by the same motive means.

One way in which my invention may be practiced is illustrated diagrammatically in Fig. 3, where a reed 3 bearing a contact member 4 is mounted upon a suitable support for vibration as actuated by magnetic means indicated generally at 5. 6 represents an armature on the reed 3. The reed may be electrically connected with one side of the source of the primary current, and the contacts 7 and 8 may be connected to the outer taps of the primary coil of the transformer. In this modification of my invention I provide a second vibrating member 9 mounted upon a suitable support and bearing contact members 10. This vibrating member may be connected with one of the power output terminals, the other power output terminal being connected with a center tap in the secondary winding of the transformer. Co-operating contact members 11 and 12 are connected with the end terminals of the secondary winding of the transformer.

If the member 9 can be made to vibrate with the same periodicity as the member 3, but out of step therewith by a quarter of a cycle, the optimum conditions as described above may be realized. This I accomplish by tying the vibrating reed 3 to the vibrating member 9 by mechanical means which have a delayed action. I have shown for this purpose a bent spring member 13 which may be of wire, or of thin sheet metal, and may have the shape shown or some other shape suitable for the purpose. In the operation of the device, as the reed 3 is driven in either direction, the spring member at first takes up the impulse, and then, after an appreciable time interval, the impulse is transferred through the resiliency of the spring member to the member 9, which then is driven in the same direction. The member 9 will therefore be driven at the same frequency as the member 3, but out of step therewith, and the degree of the out of step relationship between the members 3 and 9 may be controlled by varying the resilience, shape and disposition of the member 13, as well as the points of attachment to the vibrating members. A mass 6*a* may be employed to give the reed 9 the same vibrating period as the reed 3.

The reed 3, together with its armature and magnet 5 and 6 thus form a single prime mover for the entire device, and highly efficient rectification is secured.

In another aspect of my invention I provide means for controlling the secondary voltage until it is in such relationship to the flux that it may be rectified simultaneously with the interruptions of the primary current. If this is done, then it is not necessary to provide for a mechanical out-of-step relationship between the interrupter for the primary current, and a rectifier for the secondary voltage. Under such circumstances I may employ a single vibrating element to accomplish both functions, providing this element with sufficient contacts for the purpose.

Figure 1:
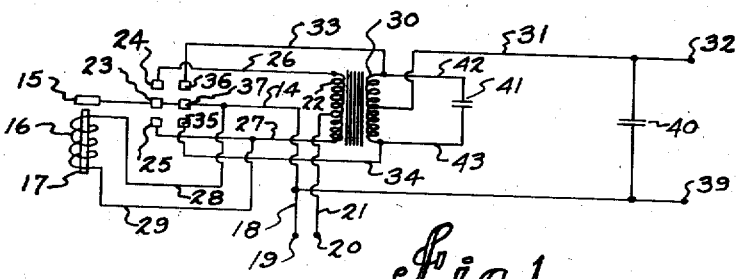
Figure 1 shows an arrangement of my invention in which the fluctuations of the secondary voltage are so modified as to bring them in proper condition for rectification by means which act simultaneously with the means for interrupting the primary current.

A system of this kind is shown in Fig. 1, wherein a vibrating reed 14 is provided with an armature 15 arranged to be actuated by a magnet 16, having a coil 17. The reed itself is connected by means of a lead 18 to an input terminal 19. The other input terminal 20 is connected by means of a lead 21 to the center tap of the primary winding 22 of a transformer. The reed bears contact members 23; and co-operative contact members 24 and 25 are provided, connected respectively by leads 26 and 27 to the end terminals of the primary winding of the transformer. The magnet coil 17 may be connected as shown by leads 28 and 29, to one of the input terminals and to one of the end terminals of the transformer. The effect of this, as shown in Fig. 1, is to apply power to the coil 17 so long as contacts 23 and 25 are open. This draws the reed downwardly in the figure. When the contacts 23 and 25 are closed, the coil 17 is short circuited thereby, and the pull on the armature 15 is released. The coil 17, of course, may be otherwise connected into the circuit, or may be separately actuated.

As to the secondary circuit, the secondary winding 30 of the transformer has its center tap connected by means of a lead 31 to an output terminal 32. Its end taps are connected respectively by leads 33 and 34 to contact members 35 and 36 located adjacent the reed. The reed bears co-operating contact members 37. The reed itself is likewise connected by means of a lead 38 to the other secondary output terminal 39. I have shown in Fig. 1 a filtering condenser 40, connected across the output terminals. This filtering condenser forms no essential part of my present invention. It will be obvious that a suitable filter system comprising at least one series inductance, and usually several shunt capacities, will be employed to smooth out the voltage fluctuations of the secondary current. In the particular installation of my exemplary embodiment the filter condenser 40 is included in the socalled B supply unit, whereas the inductance and another capacity form a part of the radio set itself.

It will be clear that the system merely as so far described would work extremely inefficiently if at all, by reason of the uncontrolled relationship between the secondary voltage and the interruption periods of the primary current. To correct this I provide means for modifying this relationship by controlling the secondary voltage. I accomplish this by shunting across the secondary winding 30 a capacity 41 connected to the end terminals of the winding by leads 42 and 43. When this is done, if the value of the capacity 41 is correctly chosen, the periods of make and break for the secondary rectifying circuit, as determined by the movements of the single reed 14, will coincide with the zero voltage periods of the secondary voltage, and also the points of maximum flux change in the transformer.

A very pretty demonstration of this may be accomplished by means of a neon tube which is arranged so that the action of the vibrating mechanism can be viewed by its light. If the neon tube, for example, be connected in either of the leads 33 or 34 and the system set in motion, either the lower or upper contacts will appear closed. If the tube is connected across the secondary winding 30, and the capacity 41 is of the proper value, and if the tube is placed behind the vibrating reed, either set of contacts will appear to be closed, depending upon which anode of the tube is illuminated; or if the tube is of the type in which adjacent plates are alternately illuminated by the glow discharge, the reed 14 will appear to be split at the interspace between the plates. If this capacity is made variable and the tube placed in series with it, then by adjusting it, the vibrating reed may be caused apparently to assume any desired position between the upper and lower contacts, thus showing the change in phase relationship between the transformer flux and the secondary voltage, which is brought about by the insertion and adjustment of the capacity 41, the correct phase relationship being one where the light shows the reed intermediate its contact, because it shows the contact about to be made at the point of maximum voltage change in the secondary circuit, i. e. at low potential value. It is on this feature that I base my statements that a shift in phase relationship takes place.

Figure 4:
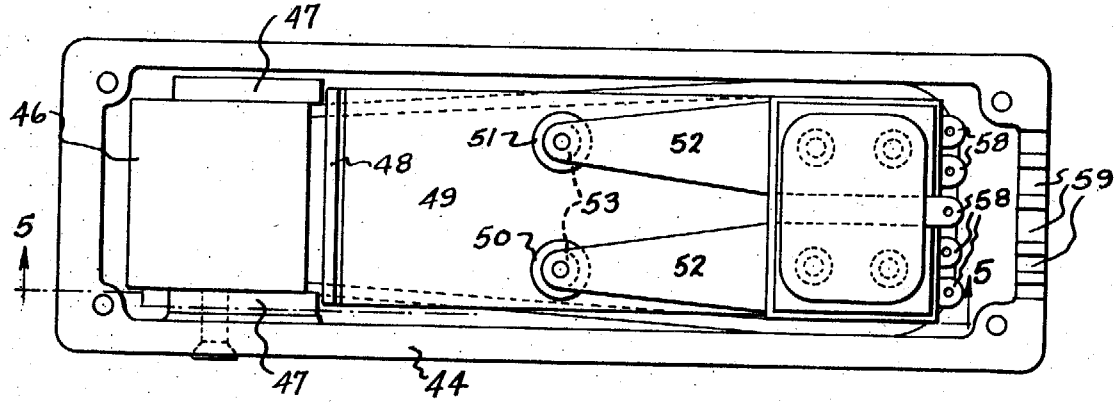
Fig. 4 is a plan view of an an embodiment of my device, with the cover removed.
Figure 5:
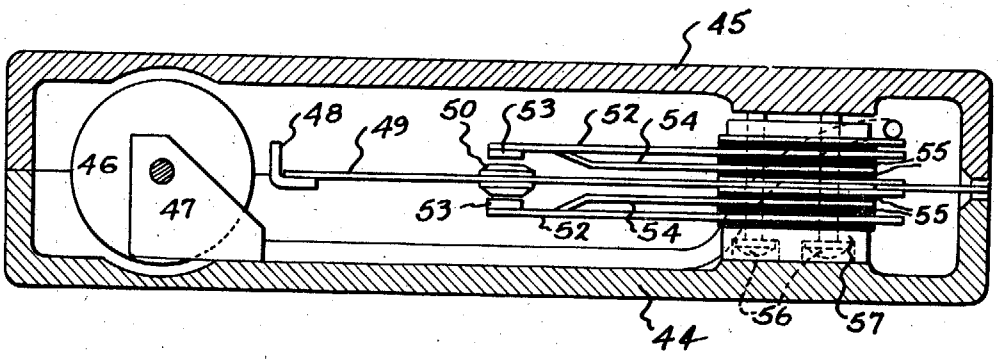
Fig. 5 is a vertical sectional view thereof, with the cover in place.

Turning now to Figs. 4 and 5, I have illustrated a commercial embodiment of my vibrating device, which, connected to a suitable transformer the secondary of which is controlled by a capacity, will provide for the reversal of the direct current primary supply and very nearly perfect full wave rectification of the secondary voltage, all without the use of tubes, and at very high electrical efficiency.

I have shown a casing 44, preferably of non-magnetic material, having a cover 45. At one end of this casing I mount a magnet having an interior core, a coil or winding 46, and end pole pieces 47. These pole pieces are interspaced as shown, so that an armature 48 mounted upon a vibrating reed 49, may be actuated thereby. The interspacing of the pole pieces 47 provides for very low flux leakage, so that the magnetic flux tends to pass between the pole pieces preferentially through the armature 48, whereby the magnetic efficiency of the vibrator is greatly increased.

The reed 49 bears contact members 50 and 51 arranged as shown. On either side of the reed 49 there are arms 52 arranged in opposed pairs and bearing contacts 53 co-operating with the contact members 50 and 51. The contact arms 52 are preferably made of resilient sheet metal cut to a shape which causes them to taper from a wide base portion to a narrow contact bearing portion, i. e. to have a modified cantilever shape. Since these arms are continually vibrated by the reed 49, they tend to fatigue at their points of mounting, which fatigue is largely prevented by making them wider at this point so that they flex uniformly.

Between each of the contact arms and the reed 49 there are back stops indicated at 54, which serve to prevent the contact arms 52 from following the reed 49 to as far as it recedes therefrom, and which serve to hold the contacts 53 a predetermined small distance away from the contacts 50 and 51 when the reed 49 is in its intermediate position. As the reed 49 moves away from this position far enough to strike a pair of the contacts 53, the spring contact mounting arms 52 allow the contacts 53 to follow the reed, thereby increasing the length of time during which the contacts are closed.

In my structure, the reed 49, the back stops 54 and the several contact arms 52 are mounted in superposed relationship at their ends, with insulating pieces 55 interposed therebetween, and are held in this relationship by insulated bolts, rivets, or the like, 56, which also serve to hold the assembled structure to the casing, or to blocks 57, which may be engaged by the casing in such a way as to be held rigidly. The reed, and the contact arms will be provided with terminal lugs 58 for electrical connection, and the end of the casing may be perforated as at 59 for the passage of the wires by which my device may be connected into a circuit such as that shown in Fig. 1.

In this way I have provided a very small, inexpensive, but effective and efficient device for the purposes hereinabove outlined. Figs. 4 and 5 of the drawings show the device upon an enlarged scale. It is preferably made very compactly; and in accordance with the teachings of my invention a so-called B source may be made for automotive or other use, consisting only of a device such as that shown in Figs. 4 and 5, a transformer, a phase controlling capacity, and a suitable casing, together with means for providing the desired electrical connection between the mechanism, in the casing and external devices and power source. The casing may, of course, contain such parts of the filter system as may be desired.

If the vibrating device is modified as shown in Fig. 3, the phase controlling capacity may be eliminated.

My invention marks a radical step forward in the production of inexpensive devices for furnishing relatively high voltage current from relatively low voltage direct current sources. Its rectification characteristics are excellent, and its overall efficiency is high. Excepting for power losses incident to the circuit, the only additional power absorbed by the system is that required to energize the magnet coil 46 in Figs. 4 and 5, or 17 in Fig. 1.

The electrical lag may also be applied to the primary circuit.

While I have described my invention in connection with a circuit employing a center tapped transformer, it will be understood, of course, that it is applicable to other types of transformers. The utility of my invention is not confined to the specific embodiment which I have herein described, but is, of course, applicable to other devices presenting similar problems; and the degree of voltage change between the primary and secondary current, and whether this change be an increase or decrease in the voltage of the secondary with respect to the voltage of the primary, are not limitations upon my invention. The system can be operated as a half wave device either as respects the primary or secondary or both, although the efficiency will be somewhat less. It will also be clear that I can employ mechanism and a system in which both mechanical and electrical lag are produced and employed.

In the claims that follow, it will be understood that by the term "interrupting" I mean to include reversal of the primary current when and if that takes place.

Having thus described my invention, what I claim as new and desire to secure by Letters Patent, is:—

1. In combination with a voltage change device, a vibrating means having a single magnetic vibrator motor, and provided with series of contacts for interrupting a primary current and for rectifying an alternating secondary voltage, and means for bringing the points of zero potential value of said secondary voltage substantially into synchronism with the interruptions of said primary current.

2. In combination with a voltage change device, a vibrating means having a single magnetic vibrator motor, provided with series of contacts for interrupting a primary current and for rectifying an alternating secondary voltage, and means for bringing the points of zero potential value of said secondary voltage into synchronism with the interruptions of said primary current, said means comprising a capacity shunting said secondary circuit.

3. In combination, a transformer and vibrating means for interrupting a primary current and for rectifying a secondary voltage, said vibrating means being unitary, and means for changing the phase of said secondary voltage to bring its points to zero potential into synchronism with the points of interruption of said primary current so as to permit of simultaneous interruption and rectification.

4. In combination with a transformer having a tapped primary and a tapped secondary, a vibrator device having motive means connected into a source of primary current and a set of contacts to cause the flux in said transformer to vary from a positive to a negative value periodically, a second set of contact devices connected with the secondary of said transformer to rectify the secondary voltage, and means for causing the contact changes of said rectifying means to occur in substantial synchronism with the points of zero potential of said secondary transformer voltage.

5. In combination with a transformer having a tapped primary and a tapped secondary, a vibrator device having motive means connected into a source of primary current and a set of contacts to cause the flux in said transformer to vary from a positive to a negative value periodically, a second set of contact devices connected with the secondary of said transformer to rectify the secondary voltage, and means for causing the contact changes of said rectifying means to occur in substantial synchronism with the points of zero potential of said secondary transformer current, said means comprising a time delay transmission mechanism between a member controlling said interrupting contacts and a member controlling said rectifying contacts.

6. In combination with a transformer having a tapped primary and a tapped secondary, a vibrator device having motive means connected into a source of primary current and a set of contacts to cause the flux in said transformer to vary from a positive to a negative value periodically, a second set of contact devices connected with the secondary of said transformer to rectify the secondary voltage, and means for causing the contact changes of said rectifying means to occur in substantial synchronism with the points of zero potential of said secondary transformer voltage, said means comprising means for modifying the phase of said transformer secondary voltage, said several sets of contacts arranged to operate in synchronism.

7. In combination, a transformer and vibrating means for interrupting a primary current and for rectifying a secondary voltage, and means for bringing the points of zero potential of said secondary voltage into synchronism with the points of interruption of the primary current, said means comprising means for shifting the phase of said primary voltage.

8. In combination with a transformer, a magnetic vibrator having a reed, contacts arranged to vibrate with said reed for interrupting a primary current to said transformer and for rectifying a secondary voltage from said transformer, and a capacity shunted across the primary of said transformer of sufficient value to shift the phase of the primary voltage thereof, to a degree such that the points of zero potential of said secondary voltage are brought into substantial synchronism with the points of interruption of said current.

9. In combination with a voltage change device, a series of contacts for interrupting a primary current, a series of contacts for rectifying an alternating secondary voltage, motive means for actuating said several series of contacts in synchronism, and means for bringing the points of zero potential value of said secondary voltage substantially into synchronism with the interruptions of said primary current.

10. In combination with a voltage change device, a series of contacts for interrupting a primary current, a series of contacts for rectifying an alternating secondary voltage, motive means for actuating said several series of contacts in synchronism, and means for controlling the secondary voltage at the time of interruption and during the period of interruption, said means comprising a capacity in shunt relationship to a winding of said voltage change device and of the proper value to permit efficient rectification.

11. In combination with a transformer having a tapped primary and a tapped secondary, a vibrator device having motive means, a set of contacts to cause the flux in said transformer to vary from a positive to a negative value periodically, and a second set of contacts to rectify the secondary voltage produced in said transformer, said sets of contacts arranged to be actuated by said motive means in substantial synchronism, and means for controlling the secondary voltage of said transformer at least at the time of interruption and during the period of interruption, said means comprising a capacity substantially in shunt relationship to said secondary, and having a proper value to permit efficient full-wave rectification.

12. In combination with a transformer having a primary and secondary, a vibrator, contacts engaged by said vibrator to simultaneously interrupt current in the primary and the output of the secondary, and a capacity across the secondary, of a value such that the vibrator is intermediate the contacts at a point of maximum current flow in the condenser circuit.

13. In combination with a transformer having a tapped primary and a tapped secondary, a vibrator device having motive means, a set of contacts to cause the flux in said transformer to vary from a positive to a negative value periodically, and a second set of contacts to rectify the secondary voltage produced in said transformer, said sets of contacts arranged to be actuated by said motive means in substantial synchronism, and means for controlling the secondary voltage of said transformer at least at the time of interruption and during the period of interruption, said means comprising a capacity in shunt relationship to said entire secondary at all times, and having a value such that the vibrator is intermediate its contacts at the moment of maximum current flow in the capacity.

14. In combination with a transformer having a tapped primary and a tapped secondary, a vibrator device having motive means, a set of contacts to cause the flux in said transformer to vary from a positive to a negative value periodically, and a second set of contacts to rectify the secondary voltage produced in said transformer, said sets of contacts arranged to be actuated by said motive means in substantial synchronism, and means for controlling the secondary voltage of said transformer at least at the time of interruption and during the period of interruption, said means comprising a capacity in shunt relationship with the entire secondary at all times.

RONALD J. ROCKWELL.